S. RODOWICZ.
VEHICLE WITH REMOVABLE INTERCHANGEABLE SUPERSTRUCTURE.
APPLICATION FILED DEC. 7, 1920.

1,403,568. Patented Jan. 17, 1922.

Witnesses
Lucas Wolski
Alphonse Graver

Inventor
Stanislas Rodowicz

UNITED STATES PATENT OFFICE.

STANISLAS RODOWICZ, OF WARSAW, POLAND.

VEHICLE WITH REMOVABLE INTERCHANGEABLE SUPERSTRUCTURE.

1,403,568.  Specification of Letters Patent.  Patented Jan. 17, 1922.

Application filed December 7, 1920. Serial No. 428,973.

*To all whom it may concern:*

Be it known that I, STANISLAS RODOWICZ, a citizen of Poland, residing at Warsaw, in Poland, have invented new and useful Improvements in Vehicles with Removable Interchangeable Superstructure, of which the following is a specification.

My invention relates to improvements in vehicles with removable, interchangeable superstructure and has for its objects, first, to provide railway, and other vehicles with a superstructure to be used on any kind of them, second, to enable the conveyance of once loaded goods in the same superstructure (open box, closed box, platform, tank, etc.,) without unloading and reloading from their original place to their destination, the superstructure being transferred with its lading from the standard gauge railway travelling body on a narrow gauge one, a railless one, a craft or a ship, as necessary in any case.

I attain these objects by the means illustrated in the accompanying drawing in application to a truck with two axles. In this drawing Figure 1 is a side view of such a truck, Figure 2 is a plan view of the same truck, Figure 3 is a view in perspective of a truck with one lifted off superstructure part, Figure 4 is a vertical section of a superstructure beam and the corresponding travelling body beam with a partial view in perspective of the superstructure beam, Figure 5 is a vertical section of a part of the truck on the line 13—13 in Fig. 2.

Figure 1:
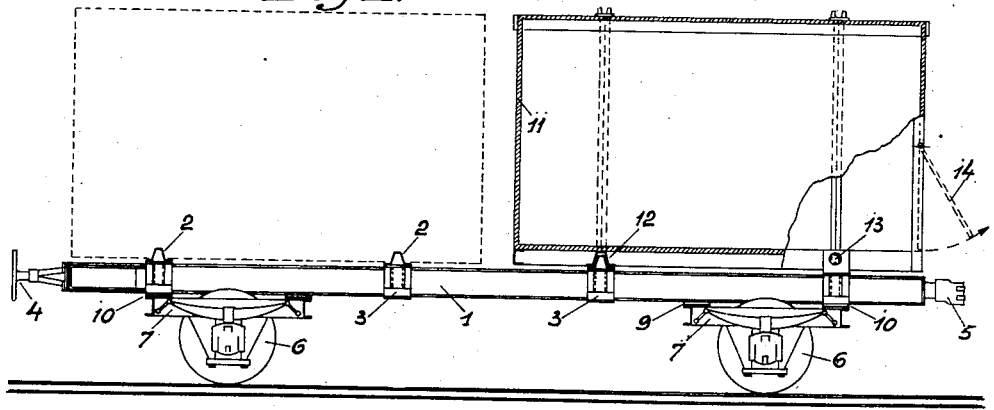
Figure 2:
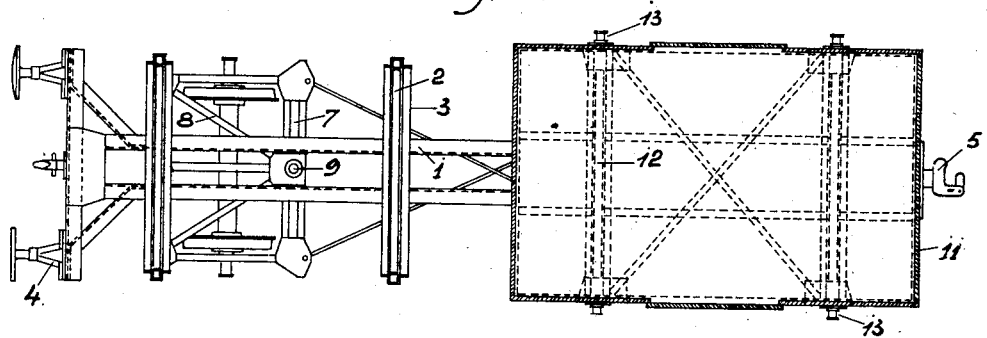

The truck frame is constructed of a beam 1 to which beams 3 are attached, upon each of which a ledge 2 of a trapezoid cross section is mounted. The beam 1 that extends lengthwise is provided at its ends with double buffer arrangements 4 or with central buffer couplings 5, and rests through the medium of the frame 7 on the wheel 6. The frame 7 consists of four bars and is stiffened by oblique rods 8. One of its long bars is attached by a pivot 9 to the long beam 1 whilst the other long bar takes the weight of the frame of the truck through the medium of a sliding support 10 attached to the cross beam above the long bar.

Figure 6:
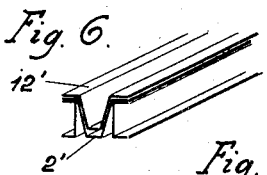
Figure 6 is a vertical section of a superstructure beam and the corresponding travelling body beam with a view in perspective of these beams, when the hollows are arranged in the travelling body and the corresponding ledges under the bottoms of the superstructure parts.
Figure 7:
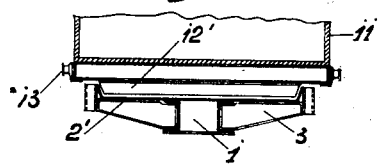
Figure 7 is a vertical section of a part of the truck with an arrangement shown in Fig. 6.

The superstructure 11 is arranged to be taken away and replaced. It is equipped at the bottom with cross beams 12 whose distance apart and cross section (which is that of an inverted trough) are such that the cross beams fit onto the ledges 2 of the cross beams 3 of the frame of the vehicles. The beams 12 fit onto the beams 2 so accurately that no longitudinal or lateral movement of the same can occur. If the hollows are arranged in the travelling body they correspond to the ledges under the bottoms of the superstructure parts as shown in the Figs. 6 and 7.

Figure 3:
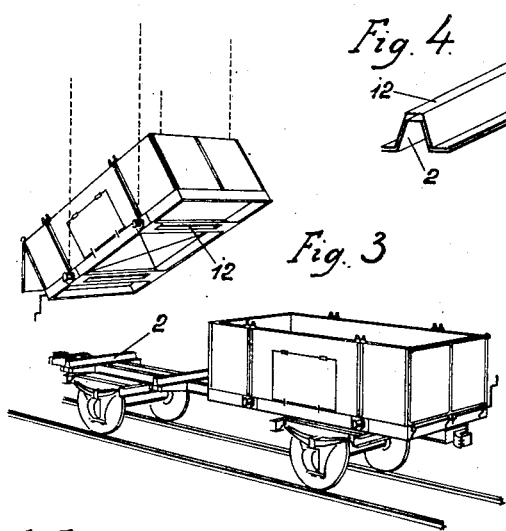
Figure 4:
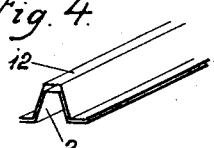
Figure 5:
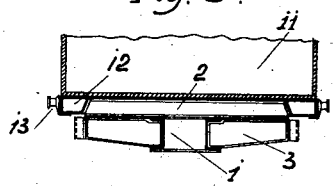

The cross beams 12 terminate at both ends in projections 13 to which lifting chains or hooks can be attached for the purpose of raising the superstructure box by means of a crane or any other suitable lifting device. Superstructure boxes provided with doors 14 at the ends may be very rapidly uploaded by tilting as shown in the Fig. 3.

It will be obvious that the scope of the invention is not limited to the constructional forms illustrated in the drawing. All kinds of superstructure, such as open boxes, closed boxes, platforms, tanks or cisterns for conveying liquids, e. g. alcohol, oil, benzene, etc., may be arranged on travelling body frames, and not only singly but also several independent superstructure parts on a sole travelling body frame.

This arrangement of superstructure that may be taken off and exchanged offers numerous advantages one of which is that for loads sent to the same destination differently shaped boxes may be placed on one and the same travelling body. The loading and unloading operations are facilitated thereby and they may be carried outside the railway station so that the time that the rolling stock must remain in the station is reduced to a minimum.

For ordinary street vehicles the form of the detachable upper and lower parts may be similar to the forms used in railway trucks. In the case of water craft the shapes of the carrying vessels, boxes, etc., may be adapted to the shape of the ship in question.

The tops of the boxes or the like that are placed on the vehicles may be so constructed that a number of boxes etc. may be stacked one upon the other.

What I claim as new and desire to secure by Letters Patent of the United States, is:

1. In railway or other vehicles comprising a travelling body and one or more removable, interchangeable superstructure parts for accommodating loads to be transported by the vehicle, the arrangement on the bottoms of the superstructure parts and on the travelling body of hollows and of corresponding ledges, the hollows and ledges fitting one onto the other preventing the horizontal displacement of the superstructure parts on the travelling body whilst enabling them to be easily lifted off the same, those of travelling body being formed by the cross beams of the frame of this body.

2. In railway or other vehicles comprising a travelling body and one or more removable, interchangeable superstructure parts for accommodating loads to be transported by the vehicle, the arrangement on the bottoms of the superstructure parts and on the travelling body of hollows and of corresponding ledges, the hollows and ledges fitting one onto the other preventing the horizontal displacement of the superstructure parts on the travelling body whilst enabling them to be easily lifted off the same, and of means at the ends of the superstructure parts cross beams for attaching them to a crane.

In testimony whereof I have signed my name to this specification.

STANISLAS RODOWICZ.

Witnesses:
LUCAS WOLSKI,
ALPHONSE GRAVIER.